3,176,011
PROCESS FOR PREPARATION OF 10α-STEROIDS FROM 2,19-CYCLO STEROIDS
Alexander D. Cross, Mexico City, Mexico, assignor to Syntex Corporation, Panama, Panama, a corporation of Panama
No Drawing. Filed Oct. 19, 1962, Ser. No. 231,830
14 Claims. (Cl. 260—239.55)

The present invention relates to a novel process for the production of cyclopentanophenanthrene derivatives.

More particularly the present invention relates to a novel process for the conversion of 2,19-cyclo steroids into the corresponding 10α-steroids, especially when applied to derivatives of the androstane and pregnane series.

The 19-hydroxy-10α-steroids obtained by the process of the present invention are important compounds with several types of activities. For instance, 19-hydroxy-10α-androstane derivatives, such as 10α-androstan-19-ol-3,17-dione, have anabolic-androgenic properties with a favorable anabolic-androgenic ratio; 19-hydroxy-10α-pregnane derivatives, such as 10α-allopregnan-19-ol-3,20-dione or 16α-methyl-10α-allopregnan-19-ol-3,20-dione, have progestational properties with good oral activity and exhibit anti-estrogenic, anti-androgenic, and anti-gonadotrophic activities.

The new process object of the present invention is illustrated by the following equation:

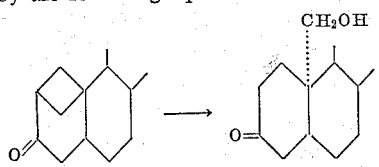

The starting compounds (I) of the process just outlined are obtained in accordance with my copending patent applications Serial Nos. 231,827; 231,828 and 231,829, filed of even date, by treatment of the corresponding 3-keto-19-hydroxy steroids with tosyl chloride under conventional conditions, and reaction of the obtained 3-keto-19-tosyloxy derivatives with a base, such as an alkali metal hydroxide, thus being produced the desired 3-keto-2,19-cyclo steroids, which are used as the starting compounds of the present process.

The aforesaid starting compounds are preferably of the androstane or pregnane series, and may have a number of substituents present in the molecule without interfering with the reaction. For example, at C–17 there may be present a ketone group, a 17β-acyloxy or hydroxy group with or without a lower hydrocarbon residue at C–17α, a 17β-acetyl group with or without a 17α-hydroxy or acyloxy group, or a dihydroxy acetone side chain preferably protected by a 17,20;20,21-bismethylenedioxy grouping; at C–16 there may be present a hydroxyl group, a keto group, a methyl group or the like. Groups similar to the above may also be present in other parts of the molecule, as for example in C–4, C–6, C–11, C–12, etc.

In accordance with the present invention a starting compound of the type described hereinbefore is treated with a strong organic or mineral acid, such as trichloroacetic acid or sulfuric acid, or with a strong base, preferably alkali metal hydroxides, alkali metal lower alkoxides or alkali metal amides, as for example sodium hydroxide, sodium methoxide or potassium amide, in a suitable solvent, preferably a polar organic solvent, such as lower hydrocarbon alcohols or lower hydrocarbon ketones, especially ethanol or actone, at a temperature comprised within ambient and steam bath temperatures, for a period of time of about 1 to 12 hours, thus affording the corresponding 19-hydroxy-10α-steroid-3-one (II).

The starting compounds of the present invention having groups susceptible to undergoing hydrolysis in an acid medium, e.g., a 17,20;20,21-bismethylenedioxy grouping or a 16α,17α-alkylidenedioxy grouping, or in a basic medium, as for example, acyloxy groups, upon treatment by the procedures disclosed hereinbefore may produce the corresponding hydrolyzed products having the 3-keto-10α-hydroxy-methyl moiety, which in turn may be, optionally, treated by conventional procedures leading to the regeneration of the hydrolyzed groupings. Even though these types of compounds undergo concomitant changes in other parts of the molecule, these changes do not hinder the normal course of the reaction in ring A of the molecule.

The isolation of the final product of the above reaction has no critical importance and may be carried out by conventional extraction, crystallization and/or chromatography procedures.

Examples of compounds which may be obtained by the present procedure are: 10α-allopregnan-19-ol-3,20-dione, 16α-methyl-10α-allopregnan-19-ol-3,20-dione, 16β-methyl-10α - allopregnan-19-ol-3,20-dione, 16α,17α - isopropylidenedioxy - 10α - allopregnan-19-ol-3,20-dione, 10α-allopregnane - 17α,19 - diol-3,20-dione, 16α-methyl-10α-allopregnane - 17α,19 - diol - 3,20 - dione, 17,20;20,21-bismethylenedioxy - 10α - allopregnan-19-ol-3-one, and 17α-methyl-10α-androstane-17β,19-diol-3-one.

The following specific examples serve to illustrate, but are not intended to limit the scope of the present invention:

*Example I*

A solution of 1 g. of 2,19-cyclo-androstane-3,17-dione in 50 cc. of ethanol was treated with 50 cc. of 70% sulfuric acid and kept for 3 hours on the steam bath. It was then poured into water and extracted with methylene chloride. The extract was successively washed with water, sodium bicarbonate solution, and water. Thereafter it was dried over sodium sulfate and evaporated to dryness. The residue was chromatographed on alumina, thus affording 10α-androstan-19-ol-3,17-dione.

*Example II*

2,19-cyclo-androstane-3,17-dione was treated in accordance with Example I except that 70% sulfuric acid was substituted by concentrated hydrochloric acid, thus giving 10α-androstan-19-ol-3,17-dione.

*Example III*

2,19-cyclo-androstane-3,17-dione was treated according to Example I, except that 70% perchloric acid was used instead of 70% sulfuric acid, thus yielding 10α-androstan-19-ol-3,17-dione.

*Example IV*

2,19-cyclo-androstane-3,17-dione was treated following the procedure of Example I, except that sulfuric acid was substituted by phosphoric acid, thus affording 10α-androstan-19-ol-3,17-dione.

*Example V*

2,19-cyclo-androstane-3,17-dione was treated by the procedure of Example I, except that sulfuric acid was substituted by trichloroacetic acid, thus affording the same product as in said example.

*Example VI*

2,19-cyclo-androstane-3,17-dione was treated in accordance with Example I, except that sulfuric acid was substituted by p-toluenesulfonic acid, thus furnishing 10α-androstan-19-ol-3,17-dione.

Example VII

A solution of 1 g. of 2,19-cyclo-androstane-3,17-dione in 50 cc. of ethanol was treated with 50 cc. of a 60% aqueous sodium hydroxide solution and kept 2 hours at steam bath temperature. The mixture was thereafter poured into water and extracted with methylene-chloride. The organic extract was washed abundantly with water, dried over anhydrous sodium sulfate and evaporated to dryness. The residue was chromatographed on alumina, thus affording 10α-androstan-19-ol-3,17-dione.

Example VIII

The process of Example VII was repeated, except that potassium hydroxide was used instead of sodium hydroxide, thus affording the same product as in said example.

Example IX

A solution of 1 g. of 2,19-cyclo-androstane-3,17-dione in 25 cc. was treated with 100 cc. of methanol containing 25 g. of sodium methoxide and kept at steam bath temperature for 5 hours. The mixture was thereafter poured into water and extracted with methylene chloride. The organic extract was washed abundantly with water, dried over anhydrous sodium sulfate and evaporated to dryness. The residue was chromatographed on alumina, thus affording 10α-androstan-19-ol-3,17-dione.

Example X 2,19-cyclo-androstane-3,17-dione was treated in accordance with Example I, except that the reaction time was 1 hour instead of 3 hours, thus giving 10α-androstan-19-ol-3,17-dione.

Example XI 2,19-cyclo-androstane-3,17-dione was treated according to Example I, except that the reaction time was 5 hours instead of 3 hours, thus producing 10α-androstan-19-ol-3,17-dione.

Example XII 2,19-cyclo-androstane-3,17-dione was treated under the conditions described in Example VII, except that the time of the reaction was prolonged to 5 hours, thus giving 10α-androstan-19-ol-3,17-dione.

Example XIII

The starting compounds listed under I (obtained in accordance with my copending patent applications Serial Nos. 231,827 and 231,828, filed of even date) were treated in accordance with Example I, thus affording the respective products listed under II.

| I | II |
|---|---|
| 2,19-cyclo-allopregnane-3,20-dione | 10α-allopregnan-19-ol-3,20-dione. |
| 16α-methyl-2,19-cycloallopregnane-3,20-dione. | 16α-methyl-10α-allopregnan-19-ol-3,20-dione. |
| 16β-methyl-2,19-cycloallopregnane-3,20-dione. | 16β-methyl-10α-allopregnan-19-ol-3,20-dione. |
| 16α-17α-isopropylidenedioxy-2,19-cyclo-allopregnane-3,20-dione. | 10α-allopregnane-16α-17α,19-triol-3,20-dione. |
| 2,19-cyclo-allopregnan-17α-ol-3,20-dione. | 10α-allopregnane-17α-19-diol-3,20-dione. |
| 16α-methyl-2,19-cycloallopregnan-17α-ol-3,20-dione. | 16α-methyl-10α-allopregnane-17α,19-diol-3,20-dione. |
| 17,20;20,21-bismethylenedioxy-2,19-cyclo-allopregnan-3-one. | 10α-allopregnane-17α,21-diol-3,20-dione. |
| 17α-methyl-2,19-cyclo-androstan-17β-ol-3-one. | 17α-methyl-10α-androstane-17β,19-diol-3-one. |

Example XIV

The starting compounds of the preceding example were treated according to Example VII, thus yielding respectively:

10α-allopregnan-19-ol-3,20-dione,
16α-methyl-10α-allopregnan-19-ol-3,20-dione,
16β-methyl-10α-allopregnan-19-ol-3,20-dione,
16α,17α-isopropylidenedioxy-10α-allopregnan-19-ol-3,20-dione,
10α-allopregnane-17α-19-diol-3,20-dione,
16α-methyl-10α-allopregnane-17α,19-diol-3,20-dione,
17,20;20,21-bismethylenedioxy-10α-allopregnan-19-ol-3-one, and
17α-methyl-10α-androstane-17β,19-diol-3-one.

Example XV 2,19-cyclo-androstane-3,17-dione was treated in accordance with Example I, except that the solvent used was acetone instead of ethanol, thus affording 10α-androstan-19-ol-3,17-dione.

Example XVI 2,19-cyclo-androstane-3,17-dione was treated according to Example I, except that the reaction took place at room temperature during 12 hours, to produce 10α-androstan-19-ol-3,17-dione.

I claim:

1. A process for the production of a 19-hydroxy-3-keto-10α-steroid which comprises treating a 3-keto-2,19-cyclo-steroid selected from the group consisting of androstane and pregnane derivatives with a reagent selected from the group consisting of strong acids and strong bases.
2. The process of claim 1 wherein the reaction is carried out in a polar organic solvent at a temperature between ambient and steam bath temperatures, for a period of time of about 1 to 12 hours.
3. The process of claim 1 wherein the reagent is a strong mineral acid.
4. The process of claim 1 wherein the reagent is a strong organic acid.
5. The process of claim 1 wherein the reagent is an alkali metal hydroxide.
6. The process of claim 1 wherein the reagent is an alkali metal lower alkoxide.
7. The process of claim 1 wherein the reagent is sulfuric acid.
8. The process of claim 1 wherein the reagent is perchloric acid.
9. The process of claim 1 wherein the reagent is phosphoric acid.
10. The process of claim 1 wherein the reagent is trichloroacetic acid.
11. The process of claim 1 wherein the reagent is p-toluenesulfonic acid.
12. The process of claim 1 wherein the reagent is sodium hydroxide.
13. The process of claim 1 wherein the reagent is potassium hydroxide.
14. The process of claim 1 wherein the reagent is sodium methoxide.

No references cited.